United States Patent
Ji

(10) Patent No.: US 12,493,550 B2
(45) Date of Patent: Dec. 9, 2025

(54) DATA CACHING METHOD, SYSTEM AND DEVICE IN AI CLUSTER, AND COMPUTER MEDIUM

(71) Applicant: INSPUR SUZHOU INTELLIGENT TECHNOLOGY CO., LTD., Jiangsu (CN)

(72) Inventor: Guiyang Ji, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/280,221

(22) PCT Filed: Feb. 28, 2022

(86) PCT No.: PCT/CN2022/078186
§ 371 (c)(1),
(2) Date: Sep. 2, 2023

(87) PCT Pub. No.: WO2023/050704
PCT Pub. Date: Apr. 6, 2023

(65) Prior Publication Data
US 2024/0152458 A1    May 9, 2024

(30) Foreign Application Priority Data

Sep. 30, 2021 (CN) .......................... 202111162807.1

(51) Int. Cl.
G06F 12/0817    (2016.01)
H04L 45/12    (2022.01)
H04L 67/568    (2022.01)

(52) U.S. Cl.
CPC .......... G06F 12/0824 (2013.01); H04L 45/12 (2013.01); H04L 67/568 (2022.05)

(58) Field of Classification Search
CPC ............. G06F 12/0824; G06F 12/0875; G06F 12/0893; G06F 12/0813; G06F 16/24552; H04L 45/12; H04L 67/568; G06N 20/00
See application file for complete search history.

(56) References Cited

U.S. PATENT DOCUMENTS

2018/0262566 A1    9/2018 Liu et al.

FOREIGN PATENT DOCUMENTS

CN    103218233 A    7/2013
CN    105743980 A    7/2016
(Continued)

*Primary Examiner* — David R Lazaro
*Assistant Examiner* — Mariegeorges A Henry
(74) *Attorney, Agent, or Firm* — IPro, PLLC

(57) ABSTRACT

The present application discloses a method for caching data in AI cluster, system, apparatus and computer medium. The method comprises: determining target data set to be cached; acquiring weight value of the target data set on each of a plurality of cluster nodes of the AI cluster; determining a target cluster node for caching the target data set; acquiring a target shortest path from remaining cluster nodes of the AI cluster to the target cluster node, and a predecessor node of the target cluster node in the target shortest path, wherein the remaining cluster nodes comprise nodes of the AI cluster except the target cluster node; determining, based on the weight value, the target shortest path and the predecessor node, a cache path for caching the target data set to the target cluster node, to cache the target data set to the target cluster node according to the cache path.

18 Claims, 4 Drawing Sheets

(56) References Cited

FOREIGN PATENT DOCUMENTS

| CN | 105120008 B | * | 5/2018 | ......... H04L 67/1004 |
| CN | 110795217 A | * | 2/2020 | ........... G06F 9/4881 |
| CN | 110971432 A | | 4/2020 | |
| CN | 111367950 A | | 7/2020 | |
| CN | 112632092 A | | 4/2021 | |
| CN | 112702399 A | | 4/2021 | |
| CN | 113094183 A | | 7/2021 | |
| CN | 113094183 B | * | 9/2021 | ........... G06F 9/5016 |
| CN | 113590666 A | | 11/2021 | |
| JP | 2019192032 A | * | 10/2019 | ........... G06F 3/0617 |

* cited by examiner

DATA CACHING METHOD, SYSTEM AND DEVICE IN AI CLUSTER, AND COMPUTER MEDIUM

This application claims priority to and benefits of Chinese Patent Application Serial No. 202111162807.1, and the title of "method for caching data in AI cluster, system, apparatus and computer medium" filed with the State Intellectual Property Office of P. R. China on Sep. 30, 2021, the entire content of which is incorporated herein by reference.

FIELD

The present disclosure relates to the technical field of artificial intelligence (AI) cluster and, more particularly, to a method for caching data in an AI cluster, a system, an apparatus and a non-transitory storage medium.

BACKGROUND

With the vigorous development of Artificial Intelligence (AI) related industries, more and more researchers of scientific research enterprises and universities have increasingly higher requirements for computing power. The construction of an AI cluster platform effectively solves the requirements of enterprises and scientific research universities for computing power. One basic function of the AI platform is to operate files, including a local download cache of a data set, reading of a file in the process of training and the like, which all depend on the storage resources of a cluster, and the AI cluster has very high storage requirements and frequent input/output (IO) operations, this makes the storage resources become the bottleneck of the data cache in the AI cluster, and affects the data cache performance of the AI cluster.

SUMMARY

The purpose of the present application is to provide a method for caching data in an AI cluster, which is capable to solve the technical problem of how to improve the data cache performance of the AI cluster to a certain extent. The application present further provides a system for caching data in the AI cluster, an apparatus and a non-transitory computer-readable storage medium.

In order to achieve the above-mentioned purpose, the present application provides the following technical solution:

A method for caching data in an AI cluster, including:
determining a target data set to be cached;
acquiring a weight value of the target data set on each of a plurality of cluster nodes of the AI cluster;
determining a target cluster node for caching the target data set;
acquiring a target shortest path from remaining cluster nodes of the AI cluster to the target cluster node, and a predecessor node of the target cluster node in the target shortest path, wherein the remaining cluster nodes include nodes of the AI cluster except the target cluster node;
determining, based on the weight value, the target shortest path and the predecessor node, a cache path for caching the target data set to the target cluster node, to cache the target data set to the target cluster node according to the cache path.

According to an embodiment of the present application, the step of, acquiring a weight value of the target data set on each of cluster nodes of the plurality of the AI cluster includes:
analyzing the type of the cluster node, for each of the plurality of the cluster nodes of the AI cluster;
under the condition that the cluster node is a management node, determining the total number of the cluster nodes in the AI cluster, and determining the total number of data sets on a shared storage node of the AI cluster;
determining a product value of the total number of the cluster nodes and the total number of the data sets as the weight value of the management node.

According to an embodiment of the present application, after analyzing the type of the cluster node, the method further includes:
under the condition that the cluster node is a non-management node, judging whether the target data set is stored on the cluster node;
under the condition that the target data set is not stored on the cluster node, determining that the weight value of the cluster node is infinity.

According to an embodiment of the present application, after judging whether the target data set is stored on the cluster node, the method further includes:
under the condition that the target data set is stored on the cluster node, determining the number of first type tasks that the target data set is pulled by the cluster node, determining the number of second type tasks that the target data set is pulled out of the cluster node, and determining a sum of the number of the first type tasks, the number of the second type tasks and 1 as the weight value of the cluster node.

According to an embodiment of the present application, the step of, acquiring the target shortest path from the remaining cluster nodes of the AI cluster to the target cluster node, and the predecessor node of the target cluster node in the target shortest path includes:
determining a first node set, wherein the first node set is configured for storing a first type of cluster node with a known target shortest path between the target cluster node;
determining a second node set, wherein the second node set is configured for storing a second type of cluster node of the AI cluster except the first node set;
determining a first shortest path between each of the second type cluster nodes and the target cluster node;
taking the second type cluster node corresponding to the first shortest path with the smallest value as a cluster node to be determined;
for each of the second type cluster nodes, determining a shortest path between the second type cluster node and the cluster node to be determined, and determining, a sum of the first shortest path and the second shortest path corresponding to the node to be determined; under the condition that the first shortest path corresponding to the second type cluster node is less than the sum, updating the target shortest path of the second type cluster node as the first shortest path corresponding to the second type cluster node; under the condition that the first shortest path corresponding to the second type cluster node is greater than the sum, updating the target shortest path of the second type cluster node as the sum, and the regarding predecessor node of the target cluster node in the shortest path corresponding to the second type cluster node is the cluster node to be determined;

updating the cluster node to be determined as the first type cluster node;

judging whether the first node set contains all cluster nodes, under the condition of no, returning to the step of taking the second type cluster node corresponding to the first shortest path with the smallest value as the cluster node to be determined, and under the condition of yes, ending.

A system for caching data in an AI cluster, including:

a first determination module, configured for determining a target data set to be cached;

a first acquisition module, configured for acquiring a weight value of the target data set on each of cluster nodes of the AI cluster;

a second determination module, configured for determining a target cluster node for caching the target data set;

a second acquisition module, configured for acquiring, a target shortest path from remaining cluster nodes of the AI cluster to the target cluster node, and a predecessor node of the target cluster node in the target shortest path, wherein the remaining cluster nodes include nodes in the AI cluster except the target cluster node;

a third determination module, configured for determining, based on the weight value, the target shortest path and the predecessor node, a cache path for caching the target data set to the target cluster node, to cache the target data set to the target cluster node according to the cache path.

According to an embodiment of the present application, the first acquisition module includes:

a first analysis unit, configured for analyzing the type of the cluster nod, for each of the plurality of the cluster nodes in the AI cluster;

a first processing unit, configured for, under the condition that the cluster node is a management node, determining the total number of cluster nodes in the AI cluster, and determining the total number of data sets on a shared storage node of the AI cluster;

determining a product value of the total number of the cluster nodes and the total number of the data sets as the weight value of the management node.

According to an embodiment of the present application, the first acquisition module further includes:

a second processing unit, configured for, under the condition that the cluster node is a non-management node, judging whether there is the target data set stored on the cluster node, and under the condition that the target data set is not stored on the cluster node, determining that the weight value of the cluster node is infinity.

According to an embodiment of the present application, the second acquisition module includes:

a first determination unit, configured for determining, a first node set, wherein the first node set is configured for storing a first type of cluster node with a known target shortest path between the target cluster node;

a second determination unit, configured for determining a second node set, wherein the second node set is configured for storing a second type of cluster node of the AI cluster except the first node set;

a third determination unit, configured for determining a first shortest path between each of the second type cluster nodes and the target cluster node;

a first setting unit, configured for taking the second type cluster node corresponding to the first shortest path with the smallest value as a cluster node to be determined;

a fourth determination unit, configured for, for each of the second type cluster nodes, determining a second shortest path between the second type cluster node and the cluster node to be determined, and determining, a sum of the first shortest path and the second shortest path corresponding to the node to be determined; under the condition that the first shortest path corresponding to the second type cluster node is less than the sum, updating the target shortest path of the second type cluster node as the first shortest path corresponding to the second type cluster node; under the condition that the first shortest path corresponding to the second type cluster node is greater than the sum, updating the target shortest path of the second type cluster node as the sum, and regarding the predecessor node of the target cluster node in the shortest path corresponding to the second type cluster node is the cluster node to be determined;

a first update unit, configured for updating the cluster node to be determined as the first type cluster node;

a first judgment unit, configured for judging whether the first node set contains all cluster nodes, under the condition of no, returning to the step of, taking the second type cluster node corresponding to the first shortest path with the smallest value as a cluster node to be determined, and under the condition of yes, ending.

An apparatus for caching data in an AI cluster, including:
a memory, configured for storing a computer program;
a processor, configured for implementing the steps of any one of the methods for caching data in the AI cluster above-mentioned, when executing the computer program.

A non-transitory computer-readable storage medium, wherein a computer program is stored in the non-transitory computer-readable storage medium, and when the computer program executed by a processor, the steps of any one of the methods for data caching in an AI cluster are implemented.

The present application provides a method for caching data in an AI cluster, which includes the following steps: determining a target data set to be cached; acquiring a weight value of the target data set on each of a plurality of cluster nodes of the AI cluster; determining a target cluster node for caching the target data set; acquiring a target shortest path from remaining cluster nodes of the AI cluster to the target cluster node, and a predecessor node of the target cluster node in the target shortest path, wherein the remaining cluster nodes include nodes in the AI cluster except the target cluster node; determining, based on the weight value, the target shortest path and the predecessor node, a cache path for caching the target data set to the target cluster node, to cache the target data set to the target cluster node according to the cache path. In the present application, since the weight value may reflect the storage capacity consumed by the target data set on each of the plurality of the cluster nodes, the target shortest path may reflect the storage capacity consumed by caching the target data set in the AI cluster, and the predecessor node may indicate the cache direction of the target data set in the AI cluster. Consequently, based on the weight value, the target shortest path and the predecessor node, determining the cache path for caching the target data set to the target cluster node, the cache path may match with the storage capacity of the AI cluster. And so that, under the condition that the target data set is cached based on the cache path subsequently, it is equivalent to cache the data set based on the storage performance of the AI cluster, thus the data cache performance of the AI cluster may be improved. The system for caching data in the AI cluster, apparatus and non-transitory computer-readable storage medium provided by the present application also solve the corresponding technical problems.

BRIEF DESCRIPTION OF THE DRAWINGS

In order to illustrate the specific embodiments of the present application or the technical solutions in the prior art more clearly, the drawings that are needed in the description of the specific embodiments or the prior art will be briefly introduced below. Apparently, the drawings in the following description are some embodiments of the present application, and other drawings may be obtained according to these drawings without creative work for a person skilled in the art.

DETAILED DESCRIPTION

The technical solutions in the embodiments of the present application will be clearly and completely described below with reference to the drawings in the embodiments of the present application. Apparently, the described embodiments are merely some of the embodiments of the present application, not all of the embodiments. Based on the embodiments of the present application, all other embodiments obtained by a person skilled in the art without creative work shall fall within the protection scope of the present application.

Figure 1:
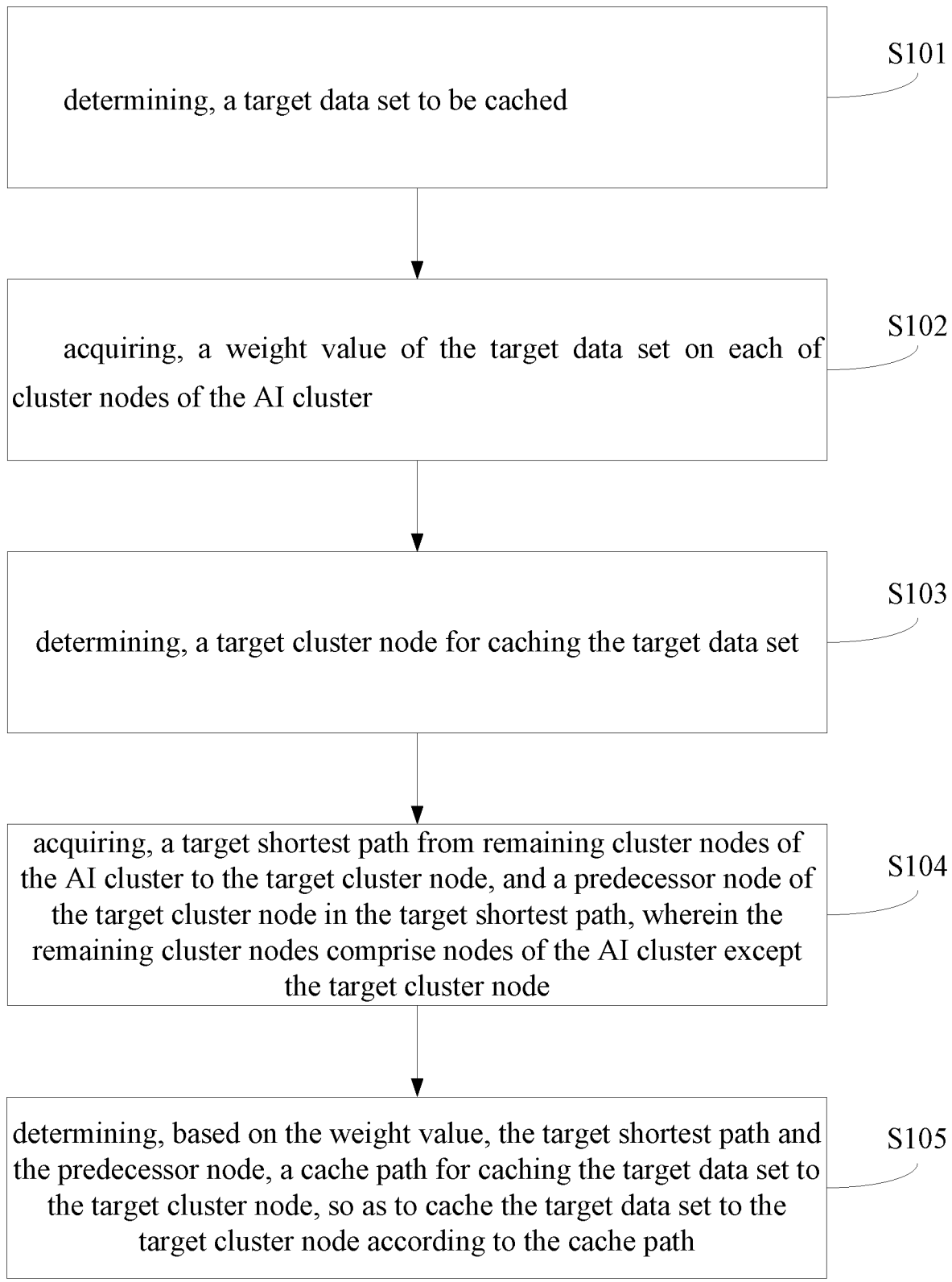
FIG. 1 is a flowchart of the method for caching the data in the AI cluster provided by an embodiment of the present application.

Please refer to FIG. 1, which is the flowchart of the method for caching the data in the AI cluster provided by an embodiment of the present application.

A method for caching data in an AI cluster provided by an embodiment of the present application may include the following steps:

S101, determining a target data set to be cached.

In practical application, since a plurality of data sets exist in the AI cluster, and a user may merely cache one or several data sets therein, the target data set to be cached may be determined firstly, and the type, content and size of the data set may be determined according to actual requirements, which is not particularly limited herein.

S102, acquiring a weight value of the target data set on each of a plurality of cluster nodes of the AI cluster.

In practical application, after determining the target data set to be cached, the weight value of the target data set on each of the cluster nodes of the AI cluster may be acquired. It is not difficult to understand that, the higher the weight value, the more storage resources are occupied by the target data set on the cluster node, so that according to the present application, with the help of this weight value, may reflect the storage resources on the cluster node consumed by the target data.

S103, determining a target cluster node for caching the target data set.

In practical application, a user may need to cache the target data set on a certain cluster node, so that the target cluster node of the cache target data set needs to be determined. Particularly, the corresponding target cluster node and the like may be determined according to the cache instruction sent by the user, and the present application is not limited herein.

S104, acquiring a target shortest path from remaining cluster nodes of the AI cluster to the target cluster node, and a predecessor node of the target cluster node in the target shortest path, wherein the remaining cluster nodes include nodes of the AI cluster except the target cluster node.

In practical application, since the cluster nodes in the AI cluster are interconnected, theoretically, each of the plurality of the cluster nodes may transmit the data set to the target cluster node. However, considering that the distribution of the target data sets in the AI cluster is not even, for example, target data set does not exist on some cluster nodes, and the shortest path from each of the cluster nodes to the target cluster node is different, after determining the target cluster node, it is also necessary to obtain the target shortest path from the remaining cluster nodes in the AI cluster to the target cluster node, and the predecessor node of the target cluster node in the target shortest path. The remaining cluster nodes include nodes of the AI cluster except the target cluster node, to determine the cache path of the target cluster node with the help of the target shortest path and the predecessor node subsequently.

It should be noted that, the predecessor node refers to the cluster node on the shortest path from the other cluster nodes to the target cluster node, and before the target cluster node. For example, under the condition that the other cluster node is a, the target cluster node is v, and the shortest path from a to v is 4, particularly is a-b-c-d-v, then the predecessor node of v may be c and the like.

S105, determining, based on the weight value, the target shortest path and the predecessor node, a cache path for caching the target data set to the target cluster node, to cache the target data set to the target cluster node according to the cache path.

In practical application, after acquiring the weight value, the target shortest path and the predecessor node, the cache path for caching the target data set to the target cluster node may be determined based on the weight value, the target shortest path and the predecessor node, to cache the target data set to the target cluster node according to the cache path. For example, other cluster nodes with the smallest weight value may be regarded as a transmission node for transmitting the target data set, and the target data set may be transmitted to the target cluster node and the like according to the target shortest path of the transmission node and the predecessor node. Of course, some other ways may be taken for determining the cache path, and the present application is not limited herein.

The present application provides a method for caching data in an AI cluster, which includes the following steps: determining a target data set to be cached; acquiring a weight value of the target data set on each of a plurality of cluster nodes of the AI cluster; determining a target cluster node for caching the target data set; acquiring a target shortest path from remaining cluster nodes of the AI cluster to the target cluster node, and a predecessor node of the target cluster node in the target shortest path, wherein the remaining cluster nodes include nodes of the AI cluster except the target cluster node; determining, based on the weight value, the target shortest path and the predecessor node, a cache path for caching the target data set to the target cluster node, to cache the target data set to the target cluster node according to the cache path. In the present application, since the weight value may reflect the storage capacity consumed by the target data set on each of the cluster nodes, the target shortest path may reflect the storage capacity consumed by caching the target data set in the AI cluster, and the predecessor node may indicate the cache direction of the target data set in the AI cluster. Therefore, based on the weight value, the target shortest path and the relay node, determining the cache path for caching the target data set to the target cluster node, the cache path may match with the storage capacity of the AI cluster, so that under the condition that the target data set is cached based on the cache path subsequently, it is equivalent to cache the data set based on the storage performance of the AI cluster, and so that the data cache performance of the AI cluster may be improved.

The present application provides the method for caching the data in the AI cluster, wherein in the process of acquiring the weight value of the target data set on each of the cluster nodes of the AI cluster, analyzing the type of the cluster node, for each of the plurality of the cluster nodes of the AI cluster; under the condition that the cluster node is a management node, determining the total number of the cluster nodes of the AI cluster, and determining the total number of data sets on a shared storage node of the AI cluster; determining, a product value of the total number of the cluster nodes and the total number of the data sets as the weight value of the management node; under the condition that the cluster node is a non-management node, judging whether there is the target data set stored on the cluster node; under the condition that the target data set is not stored on the cluster node, determining that the weight value of the cluster node is infinity; under the condition that the target data set is stored on the cluster node, determining the number of first type tasks that the target data set is pulled by the cluster node, determining the number of second type tasks that the target data set is pulled out of the cluster node, and determining a sum of the number of the first type tasks, the number of the second type tasks and 1 as the weight value of the cluster node. It should be pointed out that, the management node refers to a node of the AI cluster having a management function, and the shared storage node refers to a node that data may be shared by all cluster nodes of the AI cluster.

For easily understanding, it is assumed that the number of nodes in the AI cluster is 10, and the number of data sets on the shared storage node is 20, the weight value of the management node is 10*20=200. Assuming that a target data set exists on a cluster node a, and the number of tasks for pulling the target data set by the cluster node a is 2, and the number of tasks that the cluster node a is pulled out of the target data set is 3, then the weight value of the cluster node a may be 1+2+3=6. Under the condition that the target data set does not exist on a cluster node b, the weight value of the cluster node b is infinity.

Figure 2:
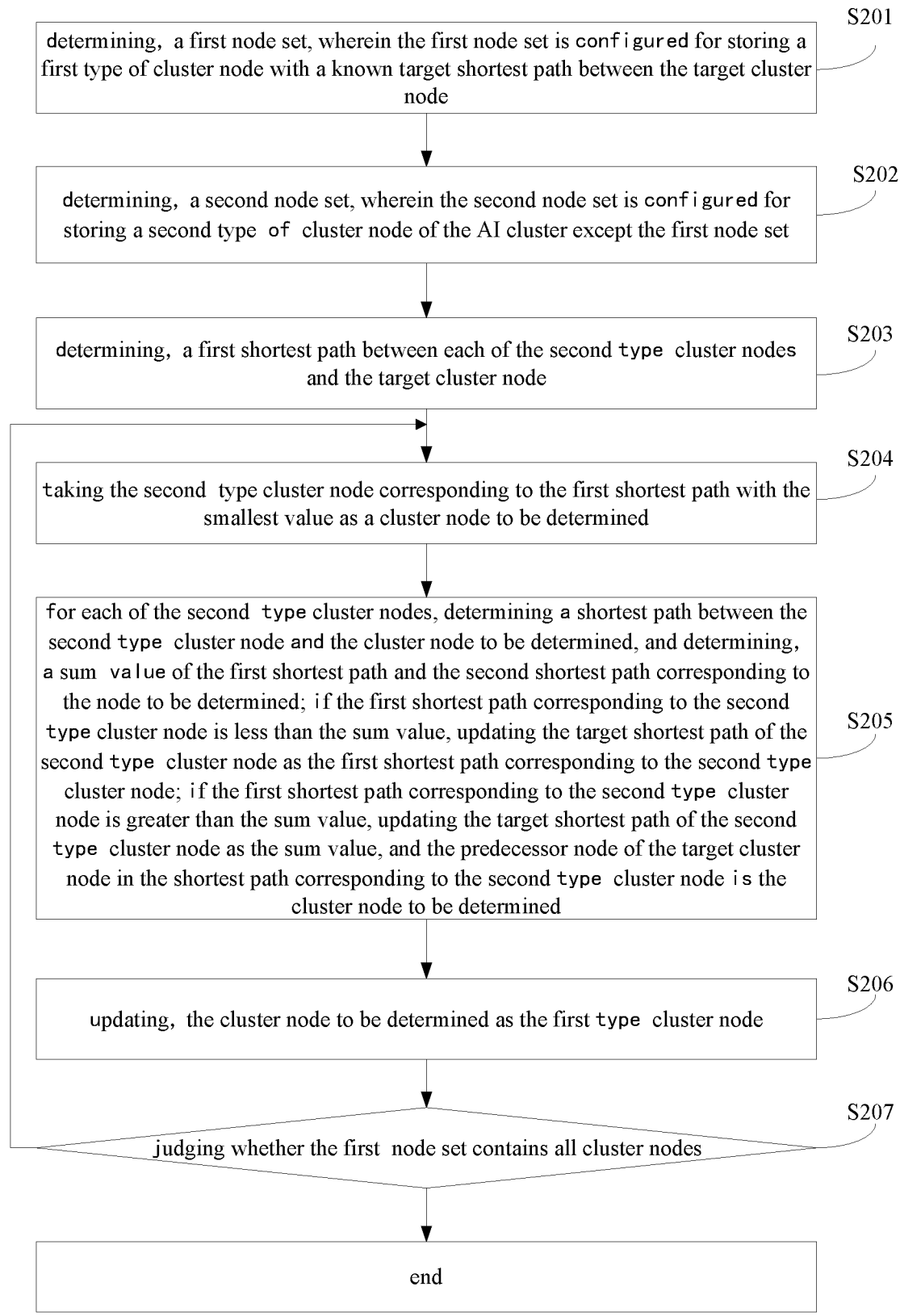
FIG. 2 is a flowchart for determining the target shortest path and the predecessor node of the present application.

Please refer to FIG. 2, which is a flowchart for determining the target shortest path and the predecessor node of the present application.

The method for caching the data in the AI cluster provided by the embodiment of the present application, wherein the process of, acquiring the target shortest path from the remaining cluster nodes of the AI cluster to the target cluster node, and the predecessor node of the target cluster node in the target shortest path may include the following steps:

Step S201, determining a first node set, wherein the first node set is configured for storing a first type of cluster node with a known target shortest path between the target cluster node.

In practical application, the target shortest path between the first type cluster node and the target cluster node may be known. Under this condition, the target shortest path of the first type cluster node may not be concerned any more, and the first type cluster node may be managed with the help of the first node set. It should be noted that, under the condition that the target shortest path of the first type cluster node is known, its corresponding predecessor node is also known.

Step S202, determining a second node set, wherein the second node set is configured for storing a second type of cluster node of the AI cluster except the first node set.

In practical application, to facilitate the management of a second type cluster node with an unknown shortest path, the second type cluster node may be centrally processed with the help of the second node set. Assuming that the first node set is S, and the total set of the cluster node of the AI cluster is V, the second node set may be V-S.

Step S203, determining a first shortest path between each of the second type cluster nodes and the target cluster node.

In practical application, since the target shortest path from the second type cluster node to the target cluster node may be split into the sum of the shortest path from the predecessor node to the target cluster node and the shortest path from the second type cluster node to the predecessor node, so that the target shortest path from the second type cluster node to the target cluster node and the corresponding predecessor node may be determined with the help of the first shortest path from the second type cluster node to the target cluster node. Assuming that the target cluster node is v, and the second type cluster node is i, the first shortest path may be expressed as dist[i]=G[i][v].

Step S204, taking the second type cluster node corresponding to the first shortest path with the smallest value as a cluster node to be determined.

Step S205, for each of the second type cluster nodes, determining a shortest path between the second type cluster node and the cluster node to be determined, and determining, a sum of the first shortest path and the second shortest path corresponding to the node to be determined; under the condition that the first shortest path corresponding to the second type cluster node is less than the sum, updating the target shortest path of the second type cluster node as the first shortest path corresponding to the second type cluster node; under the condition that the first shortest path corresponding to the second type cluster node is greater than the sum, updating the target shortest path of the second type cluster node as the sum, and regarding the predecessor node of the target cluster node in the shortest path corresponding to the second type cluster node is the cluster node to be determined.

In practical application, to conveniently determine the target shortest path and the predecessor node, the second type cluster node corresponding to the first shortest path with the smallest value may be regarded as the cluster node to be determined, that is, as the predecessor node to be verified. And for each of the second type cluster nodes, determining the second shortest path from the second type cluster node to the cluster node to be determined, and determining the sum of the first shortest path and the second shortest path corresponding to the node to be determined. Under the condition that the first shortest path corresponding to the second type cluster node is less than the sum, updating the target shortest path of the second cluster node as the first shortest path corresponding to the second type cluster node. Under the condition that the first shortest path corresponding to the second type cluster node is greater than the sum, updating the target shortest path of the second type cluster node as the sum, and the predecessor node of the target cluster node in the shortest path corresponding to the second type cluster node is the cluster node to be determined. For easily understanding, it is assumed that the cluster node to be determined is k, that is, dist[k]=min{dist[i]}; under this condition, the shortest path of the target is dist[i]=min{dist [i], dist[k]+G[i][k]}.

Step S206, updating the cluster node to be determined as the first type cluster node.

Step S207, judging whether the first node set contains all cluster nodes, under the condition of no, returning to the step S204, and under the condition of yes, ending.

In practical application, after verifying whether the cluster node to be determined is the predecessor node, the cluster node to be determined may be updated to the first type cluster node, and determining whether the first node set contains all the cluster nodes, under the condition of no, returning to the step S204. Under the condition of yes, it may be ended directly. Under this condition, the target shortest path from the second type cluster node to the target cluster node and the corresponding preceding node may be obtained.

Figure 3:
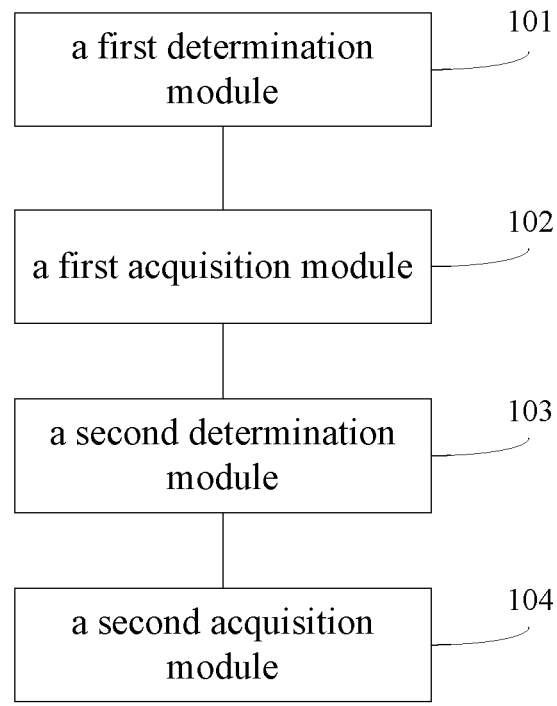
FIG. 3 is a structural schematic diagram of the system for caching the data in the AI cluster provided by an embodiment of the present application.

Please refer to FIG. 3, which is a structural schematic diagram of the system for caching the data in the AI cluster provided by an embodiment of the present application.

A system for caching data in an AI cluster provided by an embodiment of the present application may include:

A first determination module 101, configured for determining a target data set to be cached.

A first acquisition module 102, configured for acquiring a weight value of the target data set on each of a plurality of cluster nodes of the AI cluster.

A second determination module 103, configured for determining a target cluster node for caching the target data set.

A second acquisition module 104, configured for acquiring a target shortest path from remaining cluster nodes of the AI cluster to the target cluster node, and a predecessor node of the target cluster node in the target shortest path, wherein the remaining cluster nodes include nodes in the AI cluster except the target cluster node.

A third determination module 105, configured for determining, based on the weight value, the target shortest path and the predecessor node, a cache path for caching the target data set to the target cluster node, to cache the target data set to the target cluster node according to the cache path.

The system for caching the data in the AI cluster provided by an embodiment of the present application, the first acquisition module includes:
  a first analysis unit, configured for analyzing the type of the cluster nod, for each of the cluster nodes in the AI cluster;
  a first processing unit, configured for, under the condition that the cluster node is a management node, determining the total number of cluster nodes of the AI cluster, and determining the total number of data sets on a shared storage node of the AI cluster;
  determining a product value of the total number of the cluster nodes and the total number of the data sets as the weight value of the management node.

The system for caching the data in the AI cluster provided by an embodiment of the present application, wherein the system further includes:

a second processing unit, configured for, under the condition that the cluster node is a non-management node, judging whether the target data set is stored on the cluster node, and under the condition that the target data set is not stored on the cluster node, determining that the weight value of the cluster node is infinity.

The system for caching the data in the AI cluster provided by an embodiment of the present application, the second processing unit may also be the same as: under the condition that the target data set is stored on the cluster node, determining the number of first type tasks that the target data set is pulled by the cluster node, determining the number of second type tasks that the target data set is pulled out of the cluster node, and determining a sum of the number of the first type tasks, the number of the second type tasks and 1 as the weight value of the cluster node.

The system for caching the data in the AI cluster provided by an embodiment of the present application, wherein the second acquisition module includes:
  a first determination unit, configured for determining a first node set, wherein the first node set is configured for storing a first type of cluster node with a known target shortest path between the target cluster node;
  a second determination unit, configured for determining a second node set, wherein the second node set is configured for storing a second type of cluster node of the AI cluster except the first node set;
  a third determination unit, configured for determining a first shortest path between each of the second type cluster nodes and the target cluster node;
  a first setting unit, configured for taking the second type cluster node corresponding to the first shortest path with the smallest value as a cluster node to be determined;
  a fourth determination unit, configured for, for each of the second type cluster nodes, determining a second shortest path between the second type cluster node and the cluster node to be determined, and determining, a sum of the first shortest path and the second shortest path corresponding to the node to be determined; under the condition that the first shortest path corresponding to the second type cluster node is less than the sum, updating the target shortest path of the second type cluster node as the first shortest path corresponding to the second type cluster node; under the condition that the first shortest path corresponding to the second type cluster node is greater than the sum, updating the target shortest path of the second type cluster node as the sum, and regarding the predecessor node of the target cluster node in the shortest path corresponding to the second type cluster node is the cluster node to be determined;
  a first update unit, configured for updating the cluster node to be determined as the first type cluster node;
  a first judgment unit, configured for judging whether the first node set contains all cluster nodes, under the condition of no, returning to the step of, taking the second type cluster node corresponding to the first shortest path with the smallest value as a cluster node to be determined, and under the condition of yes, ending.

Figure 4:
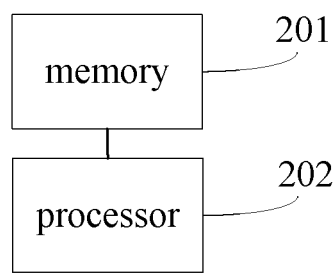
FIG. 4 is a structural schematic diagram of the apparatus for caching the data in the AI cluster provided by an embodiment of the present application.

The application further provides an apparatus for caching the data in the AI cluster and a non-transitory computer-readable storage medium, both of which have the corresponding effect of the method for caching the data in the AI cluster provided by the embodiment of the present application. Please refer to FIG. 4, which is a structural schematic diagram of the apparatus for caching the data device in the AI cluster provided by an embodiment of the present application.

An apparatus for caching data of an AI cluster provided by the embodiment of the present application, the apparatus includes a memory 201 and a processor 202, a computer program is stored in the memory 201, when the computer program is executed by the processor 202, the following steps are implemented:

determining a target data set to be cached;

acquiring a weight value of the target data set on each of a plurality of cluster nodes of the AI cluster;

determining a target cluster node for caching the target data set;

acquiring a target shortest path from remaining cluster nodes of the AI cluster to the target cluster node, and a predecessor node of the target cluster node in the target shortest path, wherein the remaining cluster nodes include nodes of the AI cluster except the target cluster node;

determining, based on the weight value, the target shortest path and the predecessor node, a cache path for caching the target data set to the target cluster node, to cache the target data set to the target cluster node according to the cache path.

The apparatus for caching the data in the AI cluster provided by the embodiment of the present application, the apparatus includes a memory 201 and a processor 202, a computer program is stored in the memory 201, when the computer program is executed by the processor 202, the following steps are implemented: analyzing the type of the cluster node, for each of the plurality of the cluster nodes of the AI cluster; under the condition that the cluster node is a management node, determining the total number of the cluster nodes in the AI cluster, and determining the total number of data sets on a shared storage node of the AI cluster; determining a product value of the total number of the cluster nodes and the total number of the data sets as the weight value of the management node.

The apparatus for caching the data in the AI cluster provided by the embodiment of the present application, the apparatus includes a memory 201 and a processor 202, a computer program is stored in the memory 201, when the computer program is executed by the processor 202, the following steps are implemented: after analyzing the type of the cluster node, under the condition that the cluster node is a non-management node, judging whether the target data set is stored on the cluster node; and under the condition that the target data set is not stored on the cluster node, determining that the weight value of the cluster node is infinity.

The apparatus for caching the data in the AI cluster provided by the embodiment of the present application, the apparatus includes a memory 201 and a processor 202, a computer program is stored in the memory 201, when the computer program is executed by the processor 202, the following steps are implemented: after judging whether the target data set is stored on the cluster node, under the condition that the target data set is stored on the cluster node, determining the number of first type tasks that the target data set is pulled by the cluster node, determining the number of second type tasks that the target data set is pulled out of the cluster node, and determining a sum of the number of the first type tasks, the number of the second type tasks and 1 as the weight value of the cluster node.

The apparatus for caching the data in the AI cluster provided by the embodiment of the present application, the apparatus includes a memory 201 and a processor 202, a computer program is stored in the memory 201, when the computer program is executed by the processor 202, the following steps are implemented: determining a first node set, wherein the first node set is configured for storing a first type of cluster node with a known target shortest path between the target cluster node; determining a second node set, wherein the second node set is configured for storing a second type of cluster node of the AI cluster except the first node set; determining a first shortest path between each of the second type cluster nodes and the target cluster node; taking the second type cluster node corresponding to the first shortest path with the smallest value as a cluster node to be determined; for each of the second type cluster nodes, determining a shortest path between the second type cluster node and the cluster node to be determined, and determining, a sum of the first shortest path and the second shortest path corresponding to the node to be determined; under the condition that the first shortest path corresponding to the second type cluster node is less than the sum, updating the target shortest path of the second type cluster node as the first shortest path corresponding to the second type cluster node; under the condition that the first shortest path corresponding to the second type cluster node is greater than the sum, updating the target shortest path of the second type cluster node as the sum, and regarding the predecessor node of the target cluster node in the shortest path corresponding to the second type cluster node is the cluster node to be determined; updating the cluster node to be determined as the first type cluster node; judging whether the first node set contains all cluster nodes, under the condition of no, returning to the step of taking the second type cluster node corresponding to the first shortest path with the smallest value as a cluster node to be determined, and under the condition of yes, ending.

Figure 5:
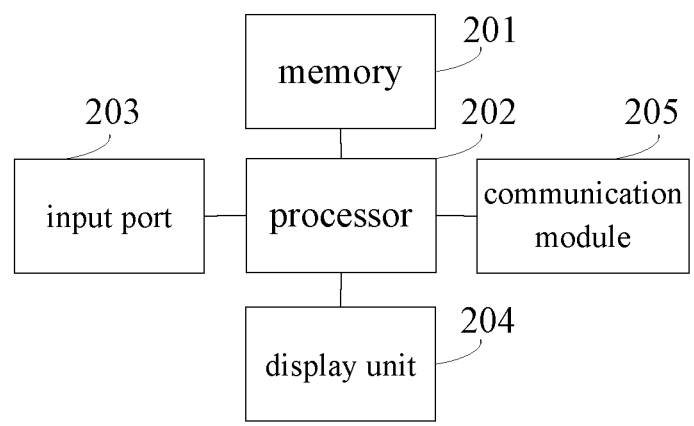
FIG. 5 is another structural diagram of the apparatus for caching the data of the AI cluster provided by an embodiment of the present application.

Please refer to FIG. 5, another apparatus for caching the data in the AI cluster provided by the embodiment of the present application may further include: an input port 203 connected to the processor 202, configured for transmitting an external input command to the processor 202; a display unit 204 connected to the processor 202, configured for displaying a processing result of the processor 202 to the external; and a communication module 205 connected with the processor 202, configured for implementing the communication between the apparatus for caching data of the AI cluster and the external. The display unit 204 may be a display panel, a laser scan display and the like. The communication modes adopted by the communication module 205 include, but are not limited to, a mobile high-definition link technology (HML), an universal serial bus (USB), a high-definition multimedia interface (HDMI), and a wireless connection: a wireless fidelity technology (WiFi), a Bluetooth communication technology, a low power consumption Bluetooth communication technology and a communication technology based on IEEE802.11s.

A non-transitory computer-readable storage medium provided by an embodiment of the present application, in which a computer program is stored, and when the computer program is executed by a processor, the following steps are implemented:

determining a target data set to be cached;

acquiring a weight value of the target data set on each of a plurality of cluster nodes of the AI cluster;

determining a target cluster node for caching the target data set;

acquiring a target shortest path from remaining cluster nodes of the AI cluster to the target cluster node, and a predecessor node of the target cluster node in the target shortest path, wherein the remaining cluster nodes include nodes of the AI cluster except the target cluster node;

determining, based on the weight value, the target shortest path and the predecessor node, a cache path for caching the target data set to the target cluster node, to cache the target data set to the target cluster node according to the cache path.

The non-transitory computer-readable storage medium provided by an embodiment of the present application, in which a computer program is stored, and when the computer program is executed by a processor, the following steps are implemented: analyzing the type of the cluster node, for each of the plurality of the cluster nodes in the AI cluster; under the condition that the cluster node is a management node, determining the total number of the cluster nodes of the AI cluster, and determining the total number of data sets on a shared storage node of the AI cluster; determining a product value of the total number of the cluster nodes and the total number of the data sets as the weight value of the management node.

The non-transitory computer-readable storage medium provided by an embodiment of the present application, in which a computer program is stored, and when the computer program is executed by a processor, the following steps are implemented: after analyzing the type of the cluster node, under the condition that the cluster node is a non-management node, judging whether the target data set is stored on the cluster node; and under the condition that the target data set is not stored on the cluster node, determining that the weight value of the cluster node is infinity.

The non-transitory computer-readable storage medium provided by an embodiment of the present application, in which a computer program is stored, and when the computer program is executed by a processor, the following steps are implemented: after judging whether the target data set is stored on the cluster node, under the condition that the target data set is stored on the cluster node, determining the number of first type tasks that the target data set is pulled by the cluster node, determining the number of second type tasks that the target data set is pulled out of the cluster node, and determining a sum of the number of the first type tasks, the number of the second type tasks and 1 as the weight value of the cluster node.

The non-transitory computer-readable storage medium provided by an embodiment of the present application, in which a computer program is stored, and when the computer program is executed by a processor, the following steps are implemented: determining a first node set, wherein the first node set is configured for storing a first type of cluster node with a known target shortest path between the target cluster node; determining a second node set, wherein the second node set is configured for storing a second type of cluster node of the AI cluster except the first node set; determining a first shortest path between each of the second type cluster nodes and the target cluster node; taking the second type cluster node corresponding to the first shortest path with the smallest value as a cluster node to be determined; for each of the second type cluster nodes, determining a shortest path between the second type cluster node and the cluster node to be determined, and determining, a sum of the first shortest path and the second shortest path corresponding to the node to be determined; under the condition that the first shortest path corresponding to the second type cluster node is less than the sum, updating the target shortest path of the second type cluster node as the first shortest path corresponding to the second type cluster node; under the condition that the first shortest path corresponding to the second type cluster node is greater than the sum, updating the target shortest path of the second type cluster node as the sum, and regarding the predecessor node of the target cluster node in the shortest path corresponding to the second type cluster node is the cluster node to be determined; updating the cluster node to be determined as the first type cluster node; judging whether the first node set contains all cluster nodes, under the condition of no, returning to the step of taking the second type cluster node corresponding to the first shortest path with the smallest value as a cluster node to be determined, and under the condition of yes, ending.

The non-transitory computer-readable storage media involved in the present application include a random access memory (RAM), a memory, a read-only memory (ROM), an electrically programmable ROM, an electrically erasable programmable ROM, a register, a hard disk, a removable disk, a CD-ROMs, or any other forms of non-transitory storage medium known in the technical field.

For the description of the relevant parts of system, apparatus for caching data of the AI cluster and non-transitory computer-readable storage medium provided by the embodiment of the present application, please refer to the detailed description of the corresponding part of the method for caching data of the AI cluster provided by the embodiment of the present application, which will not be repeated herein. In addition, a portion of the above-mentioned technical solution provided by the embodiment of the present application, the implementation principle of which consistent with that of the corresponding technical solution in the prior art is not described in details, so that repeated description is avoided.

It should also be noted that, in this application, relational terms, for example first and second, are merely used for distinguishing one entity or operation from another entity or operation, and do not necessarily require or imply that there is any such actual relationship or order between these entities or operations. Moreover, the terms "include", "comprise" or any other variation thereof are intended to cover a non-exclusive inclusion, such that a process, method, object or apparatus that includes a series of elements includes not merely those elements, but also other elements not explicitly listed, or elements inherent to such process, method, article or equipment. Without further restrictions, an element defined by the phrase "including one . . . " does not exclude the existence of other identical elements in the process, method, object or apparatus The foregoing description of the disclosed embodiments enables a person skilled in the art to implement or use the present application. Various modifications to these embodiments will be apparent to the person skilled in the art, and the general principles defined herein may be implemented in other embodiments without departing from the spirit or scope of the present application. Therefore, the present application will not be limited to these embodiments shown herein, but is to be accorded the widest scope consistent with the principles and novel features disclosed herein.

The invention claimed is:

1. A method for caching data in an AI cluster, comprising:
   determining a target data set to be cached;
   acquiring a weight value of the target data set on each of a plurality of cluster nodes of the AI cluster;
   determining a target cluster node for caching the target data set;
   acquiring a target shortest path from remaining cluster nodes of the AI cluster to the target cluster node, and a predecessor node of the target cluster node in the target shortest path, wherein the remaining cluster nodes comprise nodes of the AI cluster except the target cluster node;

determining, based on the weight value, the target shortest path and the predecessor node, a cache path for caching the target data set to the target cluster node, to cache the target data set to the target cluster node according to the cache path-;

wherein the step of, acquiring the target shortest path from the remaining cluster nodes of the AI cluster to the target cluster node, and the predecessor node of the target cluster node in the target shortest path comprises:

determining a first node set, wherein the first node set is configured for storing a first type of cluster node with a known target shortest path between the target cluster node;

determining a second node set, wherein the second node set is configured for storing a second type of cluster node of the AI cluster except the first node set;

determining a first shortest path between each of the second type cluster nodes and the target cluster node;

taking the second type cluster node corresponding to the first shortest path with the smallest value as a cluster node to be determined;

for each of the second type cluster nodes, determining a shortest path between the second type cluster node and the cluster node to be determined, and determining a sum of the first shortest path and the second shortest path corresponding to the node to be determined; under the condition that the first shortest path corresponding to the second type cluster node is less than the sum, updating the target shortest path of the second type cluster node as the first shortest path corresponding to the second type cluster node; under the condition that the first shortest path corresponding to the second type cluster node is greater than the sum, updating the target shortest path of the second type cluster node as the sum, and regarding the predecessor node of the target cluster node in the shortest path corresponding to the second type cluster node is the cluster node to be determined;

updating the cluster node to be determined as the first type cluster node;

judging whether the first node set contains all cluster nodes, under the condition of no, returning to the step of taking the second type cluster node corresponding to the first shortest path with the smallest value as the cluster node to be determined, and under the condition of yes, ending.

2. The method according to claim 1, wherein the step of, acquiring the weight value of the target data set on each of the plurality of cluster nodes of the AI cluster comprises:

analyzing the type of the cluster node for each of the plurality of the cluster nodes of the AI cluster;

under the condition that the cluster node is a management node, determining the total number of the cluster nodes of the AI cluster, and determining the total number of data sets on a shared storage node of the AI cluster;

determining a product value of the total number of the cluster nodes and the total number of the data sets as the weight value of the management node.

3. The method according to claim 2, wherein after analyzing the type of the cluster node, the method further comprises:

under the condition that the cluster node is a non-management node, judging whether the target data set is stored on the cluster node; and under the condition that the target data set is not stored on the cluster node, determining that the weight value of the cluster node is infinity.

4. The method according to claim 3, wherein after judging whether the target data set is stored on the cluster node, the method further comprises:

under the condition that the target data set is stored on the cluster node, determining the number of first type tasks that the target data set is pulled by the cluster node, determining the number of second type tasks that the target data set is pulled out of the cluster node, and determining a sum of the number of the first type tasks, the number of the second type tasks and 1 as the weight value of the cluster node.

5. The method according to claim 2, wherein in the step of, under the condition that the cluster node is the management node, determining the total number of the cluster nodes of the AI cluster, and determining the total number of data sets on the shared storage node of the AI cluster, wherein the management node refers to a node of the AI cluster having a management function.

6. The method according to claim 2, wherein in the step of, under the condition that the cluster node is the management node, determining the total number of the cluster nodes of the AI cluster, and determining the total number of data sets on the shared storage node of the AI cluster, wherein the shared storage node refers to a node that data is capable to be shared by all cluster nodes of the AI cluster.

7. The method according to claim 1, wherein the step of, determining the target cluster node for caching the target data set comprises:

the corresponding target cluster node is capable to be determined according to a cache instruction sent by a user.

8. The method according to claim 1, wherein in the step of, acquiring the target shortest path from the remaining cluster nodes of the AI cluster to the target cluster node, and the predecessor node of the target cluster node in the target shortest path, wherein the predecessor node refers to a cluster node on the shortest path from the other cluster nodes to the target cluster node, and before the target cluster node.

9. The method according to claim 1, wherein the step of, determining, based on the weight value, the target shortest path and the predecessor node, the cache path for caching the target data set to the target cluster node, to cache the target data set to the target cluster node according to the cache path comprises:

regarding other cluster nodes with the smallest weight value as a transmission node for transmitting the target data set, and transmitting the target data set to the target cluster node according to the target shortest path of the transmission node and the predecessor node.

10. An apparatus for data caching in an AI cluster, comprising:

a memory, configured for storing a computer program;

a processor, configured for, when executing the computer program, implementing the steps of the method for caching data in the AI cluster according to claim 1.

11. The apparatus for data caching in an AI cluster according to claim 10, wherein the step of, acquiring the weight value of the target data set on each of the plurality of cluster nodes of the AI cluster comprises:

analyzing the type of the cluster node for each of the plurality of the cluster nodes of the AI cluster;

under the condition that the cluster node is a management node, determining the total number of the cluster nodes of the AI cluster, and determining the total number of data sets on a shared storage node of the AI cluster;
determining a product value of the total number of the cluster nodes and the total number of the data sets as the weight value of the management node.

12. The apparatus for data caching in an AI cluster according to claim 11, wherein after analyzing the type of the cluster node, the method further comprises:
under the condition that the cluster node is a non-management node, judging whether the target data set is stored on the cluster node; and
under the condition that the target data set is not stored on the cluster node, determining that the weight value of the cluster node is infinity.

13. The apparatus for data caching in an AI cluster according to claim 12, wherein after judging whether the target data set is stored on the cluster node, the method further comprises:
under the condition that the target data set is stored on the cluster node, determining the number of first type tasks that the target data set is pulled by the cluster node, determining the number of second type tasks that the target data set is pulled out of the cluster node, and determining a sum of the number of the first type tasks, the number of the second type tasks and 1 as the weight value of the cluster node.

14. The apparatus for data caching in an AI cluster according to claim 11, wherein in the step of, under the condition that the cluster node is the management node, determining the total number of the cluster nodes of the AI cluster, and determining the total number of data sets on the shared storage node of the AI cluster,
wherein the management node refers to a node of the AI cluster having a management function.

15. The apparatus for data caching in an AI cluster according to claim 10, wherein the step of, determining the target cluster node for caching the target data set comprises:
the corresponding target cluster node is capable to be determined according to a cache instruction sent by a user.

16. The apparatus for data caching in an AI cluster according to claim 10, wherein in the step of, acquiring the target shortest path from the remaining cluster nodes of the AI cluster to the target cluster node, and the predecessor node of the target cluster node in the target shortest path,
wherein the predecessor node refers to a cluster node on the shortest path from the other cluster nodes to the target cluster node, and before the target cluster node.

17. The apparatus for data caching in an AI cluster according to claim 10, wherein the step of, determining, based on the weight value, the target shortest path and the predecessor node, the cache path for caching the target data set to the target cluster node, to cache the target data set to the target cluster node according to the cache path comprises:
regarding other cluster nodes with the smallest weight value as a transmission node for transmitting the target data set, and transmitting the target data set to the target cluster node according to the target shortest path of the transmission node and the predecessor node.

18. A non-transitory computer-readable storage medium, wherein a computer program is stored in the non-transitory computer-readable storage medium, and when the computer program is executed by a processor, the steps of the method for data caching in an AI cluster according to claim 1 are implemented.

* * * * *